Feb. 4, 1941.  W. E. CRAWFORD ET AL  2,230,527
SPEED CONTROL DEVICE
Filed Aug. 1, 1939
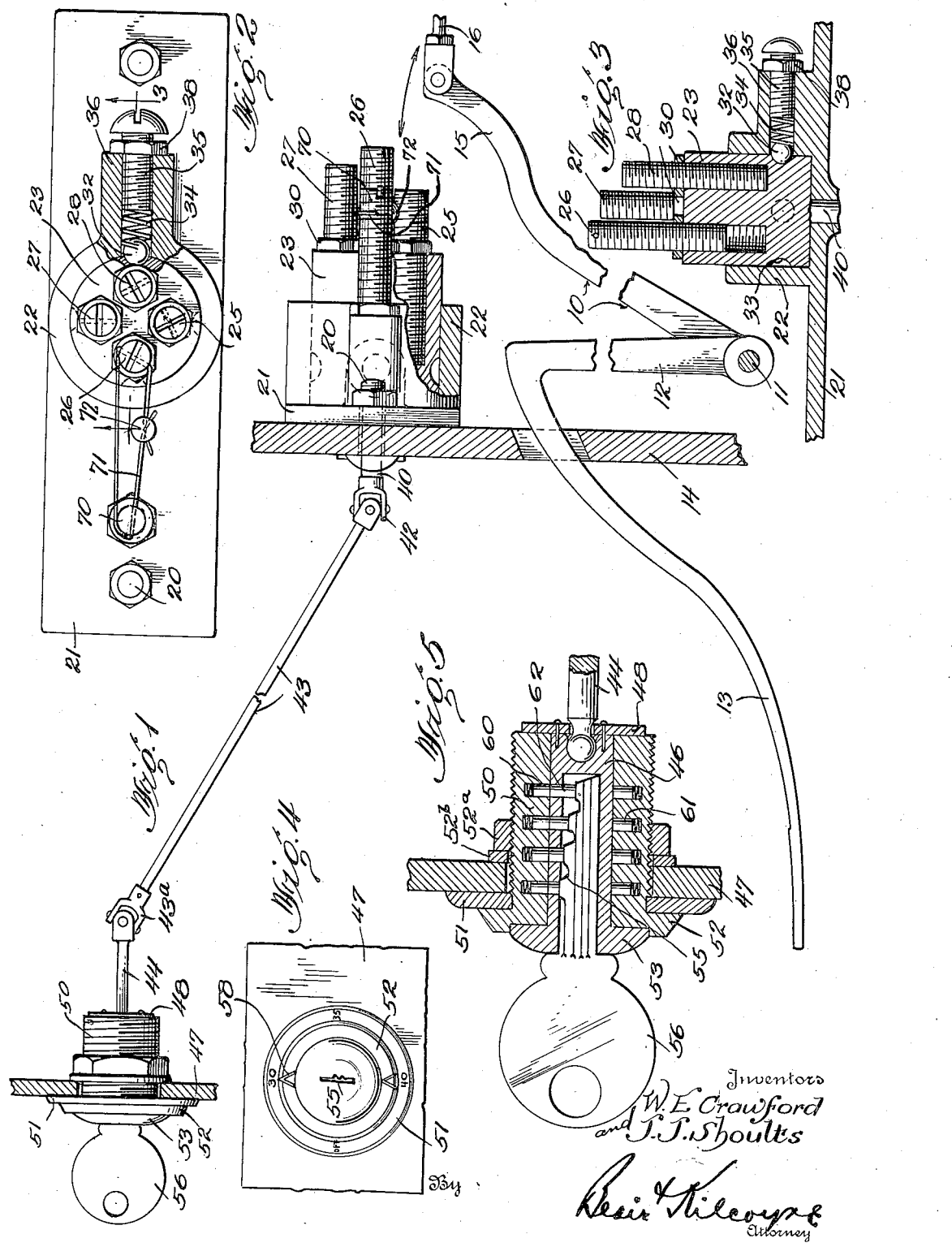
Inventors
W. E. Crawford
and J. J. Shoults
By
Reair Kilcoyne
Attorney Patented Feb. 4, 1941

2,230,527

UNITED STATES PATENT OFFICE 2,230,527

SPEED CONTROL DEVICE

William E. Crawford and Johnnie J. Shoults, Memphis, Tenn.

Application August 1, 1939, Serial No. 287,816

6 Claims. (Cl. 74—526)

This invention relates to improvements in speed control devices for automobiles, trucks and like vehicles, and in regard to its more specific aspects, to a governor adapted to selectively fix the speeds at which the automobile or truck which it controls can be driven. Among the objects of the present invention may be noted the provision of an improved speed governor for automobiles, trucks and like vehicles, which is characterized by inexpensive construction and installation, as well as dependability and effectiveness in operation; the provision of a speed governor of the stated character having a plurality of speed settings, any one of which may be selected at will, whereby the limiting speed of the vehicle may be varied at will; the provision of a speed governor of the above character with which is associated locking means operative to lock the governor at the selected speed setting and requiring positive release to change from one speed setting to another; the provision of a speed governor operative to selectively fix the speeds at which an automobile or truck with which it is associated may be driven, which is settable and/or releasable from the driver's station and which thus requires no lifting of the hood or a mechanic's attention for operation; and the provision of a speed governor which can be associated with any part of the acceleration system that moves in an approximately straight line and which is thereby equally applicable to acceleration systems operating from a foot pedal and from a hand throttle.

Other objects will be in part obvious and in part hereinafter pointed out in connection with the following analysis of this invention wherein is illustrated an embodiment of the invention in detail.

In the drawing—

Fig. 1 is a side elevation, partly in section, of a speed governor in accordance with the present invention associated with the foot pedal control of an automobile or truck acceleration system;

Fig. 2 is a front face view of the abutment or stop assembly employed in the governor as aforesaid;

Fig. 3 is a section along lines 3—3 of Fig. 2;

Fig. 4 is a detail illustrating the dash control assembly of the governor as illustrated in Fig. 1;

Fig. 5 is a section taken through the control assembly illustrated in Fig. 4 and illustrates in detail a preferred means for locking the governor at a particular setting.

Referring now to the drawing wherein like reference characters designate like parts throughout the several views, reference character 10 designates generally a bellcrank forming a part of the acceleration system of an automobile or truck, the bellcrank being fulcrumed to turn on the axis of a mounting rod 11. Such bellcrank generally includes a pedal arm 12 from which the foot acceleration pedal 13 extends relatively rearwardly through the flame-wall or floor board 14 of the vehicle, and further includes a carburetor arm 15 which extends relatively forwardly and is connected at its upper end to one end of a rod 16, the other end of which is secured to a carburetor arm (not shown). As will be understood, depression of the pedal 13 by the foot of the operator causes turning movement of the bellcrank 10 in counter-clockwise direction and hence substantially straight-line movement to the left of the rod 16. Such movement of rod 16, in the typical construction being described, results in opening of the butterfly valve of the carburetor and hence an increased supply of the fuel mixture to the motor.

The present invention in its broader aspects may be said to reside in the provision of means for selectively limiting the leftwise movement permitted the carburetor rod 16 thereby to selectively establish and determine the amount of the fuel mixture supplied to the motor, on which latter, as is well understood, the speed at which the vehicle may be driven depends.

To this end we secure to the relatively front face of the flame-wall 14, through the medium of bolts 20, a mounting plate 21 having a sleeve or bushing-like extension 22 for the reception of a rotary cylinder 23. The said cylinder provides a mounting for a plurality of adjustable abutment pins or stops 25, 26, 27, 28, which are arranged on equal radii from the cylinder center or axis. The pins are screw-threaded into the cylinder 23 to extend forwardly thereof, being held in adjusted position with reference to the cylinder by lock nuts 30. The positioning of the mounting plate 21 is such that cylinder 23 is disposed generally rearwardly of the upper end of the carburetor arm 15 of the bellcrank 10, and so that any one of the abutment pins 25, 26, 27, 28 may upon proper rotation of the cylinder take up a position immediately to the rear of the upper end of the carburetor arm, thus to limit the leftwise movement of rod 16 and opening of the carburetor valve actuated thereby.

Cylinder 23 is mounted for rotation in the mounting plate bushing 22 and is adapted to be maintained in any one of the four positions to which it may be actuated, through the medium of a locating ball 32 which bears against the cylinder and is adapted to be received in one of the four ball seats 33 formed in the peripheral surface thereof. The locating ball 32 is urged into and against a seat by a spring 34 and adjusting screw 35, the spring and screw being carried by a lateral extension 36 formed on the mounting bushing 22. Screw 35 may be locked in its adjusted position as by a lock nut 38.

In order that the cylinder 23 may be rotated from the driver's station, the cylinder is provided with a rearward extension 40 which projects through the flame-wall 14, being connected at its end through the medium of a universal coupling 42 with an upwardly and rearwardly inclined rod 43. The rod at its upper end is coupled through a universal coupling 43a, with one end of a stem 44 which may be of square section, the other end of which preferably seats in a recess formed in the rear face of a cylinder 46 of a lock assembly mounted on the vehicle dash or instrument board 47, being secured to the cylinder 46 for turning movement therewith as by a foot cap 48 having a square opening to cooperate with the flat faces of said stem. The cylinder 46 is rotatably carried in a lock barrel 50, between the front flange 52 of which and the instrument board is arranged a dial or setting plate 51, the lock assembly and plate being secured to the instrument board by a nut and washer connection 52a, 52b. The lock cylinder 46 may have one end enlarged to provide a head 53, through which and the cylinder proper extends a key slot for the reception of a key generally designated 56. Preferably the front face of the cylinder head 53 may have formed or inscribed thereon an arrow or pointer means 58 for the convenience of the operator in establishing the setting of the governor.

The lock assembly is preferably of the plural-position type, that is to say, the cylinder has a plurality of locking positions as determined by the number of sets of locking pins carried by the lock barrel. In Fig. 5 two of the four sets of locking pins herein employed are illustrated, the upper set being generally designated 60 and the lower set 61. As is well understood, said pins cooperate with a single set of pins 62 carried by the lock cylinder, and it will be further understood that in such a plural-position lock a key such as the key 56 must be inserted before the cylinder can be released, and that upon withdrawal of the key following turning of the cylinder to one of its locking positions, one of the sets of barrel-carried pins, such as 60 or 61, functions to lock the cylinder in that position.

In the construction under illustration, four locking positions, and hence four governor settings, are contemplated to correspond to the four abutment pins 25, 26, 27 and 28, one position being designated on the setting plate as the "off" position, a second locking position being designated as the "30" position, a third position being designated as the "35" position, and a fourth position being designed the "40" position. In the "off" position the governor is ineffective and carburetor rod 16 may be moved to the left the full amount as permitted by depression of the accelerator pedal 13. Upon insertion of key 56 in the lock to release the lock cylinder from that position, the lock cylinder may be moved to any one of the "30", "35" or "40" positions, which positions, respectively, indicate speed settings at 30 miles per hour, 35 miles per hour, and 40 miles per hour.

This movement of the lock cylinder to a selected position as aforesaid causes rotation of the stem 44, rod 43 and cylinder 23 throughout an arc corresponding to the arc of movement of the lock cylinder. Thus, as lock cylinder is turned to the "30" position, cylinder 23 is turned to bring abutment pin 26 into the path of movement of the upper end of the carburetor arm 15. The length of the abutment pin is adjusted so as to permit leftwise movement of carburetor rod 16 an amount corresponding to a 30 mile per hour setting of the carburetor valve, and thus foot pedal 13 can be depressed only the limited amount corresponding to this setting. Similarly, as lock cylinder 46 is turned to its "35" position, cylinder 23 is rotated to bring abutment pin 27 behind the upper end of the carburetor arm 15. The length of pin 27 is such as to permit movement of rod 16 to the left an amount which corresponds to the valve opening for a 35 mile per hour speed, depression of accelerator pedal 13 being limited to that speed. Similarly, rotation of cylinder 23 by setting the lock in its "40" position acts to limit, through positioning of the shortest abutment pin 28 behind the upper end of the carburetor arm 15, the depression of the accelerator to an amount corresponding to speeds up to 40 miles per hour.

It will be understood that the abutment cylinder 23 is held in the position to which it has been set by the action of the locating ball 32 in one of the ball seats 33, the pressure of the ball spring 34 being such as positively to hold the cylinder in its located position, even though key 56 is unintentionally left in the lock assembly following a speed setting manipulation thereof.

The abutment pin 25 referred to above is substantially shorter than the pins 26, 27 and 28 and, as it correponds to the "off" position of the governor, may be eliminated entirely or may be retained to provide a setting intermediate the "off" or zero position and the 30 miles per hour setting, in which latter event abutment pin 25 would, by unthreading from cylinder 23, have its end brought to such position that it would act as a stop for the leftwise movement of carburetor rod 16 at the intermediate speed. Sealing means operating in conjunction with the governor as described is preferably employed to indicate any unauthorized tampering with or attempt to change the setting of the governor. One form of sealing means is illustrated in Fig. 2, wherein a fixed bolt or pin 70 extends forwardly of the mounting plate 21 and laterally of the sleeve 22 and its contained cylinder 23. Said pin 70 is drilled to provide a hole therethrough, the pins 25, 26, 27, 28 being similarly apertured. Following the setting of the governor by the lock and setting assembly as above described, a wire 71 may be threaded through the aperture of the stop pin then closest to pin 70 and the ends thereof sealed as by a lead sealing disc 72. Any attempt to tamper with the setting of the governor woud of course disturb the seal 72 and be readily apparent.

While in the foregoing reference has been made to settings at 30, 35 and 40 miles per hour speeds, it will be understood that such are given only for purposes of illustration and description, as the governor may be set at other desired speeds through proper adjustment of the length of the abutment pins 26, 27 and 28. Further, while only three settings in addition to the "off" position have been illustrated and described, it will be understood that provision may be had for a greater number of speed settings as by providing more than the three abutment pins 26, 27 and 28, and by providing a lock assembly having more than the four locking positions as described.

From the foregoing description, it will be understood that once the governor is locked at a selected speed setting, the speed of the vehicle is limited to that setting until the setting is positively changed through appropriate actuation of the lock and key assembly. This is particularly advantageous to car and truck owners who, for one reason or another, desire or are forced to limit the speed at which the vehicle is to be driven by persons of immature age, truck drivers, and the like. It will be further understood that the governor is positive in its action as there is little or no tendency for the carburetor arm 15 to slide off the flat ends of the abutment pins, and for the reason, further, that the abutment pins are positioned definitely to block movement of the carburetor arm 15 and carburetor rod 16 beyond that corresponding to the desired setting.

It will be further obvious that a governor as described can be installed on cars already in use without material change or modification thereof and without expensive installation costs. It may also be applied to acceleration systems operated by the hand throttle inasmuch as such systems, like the pedal control systems, employ a carburetor rod moving in a substantially straight line.

As many changes could be made in carrying out the above constructions without departing from the scope of the invention, it is intended that all matter contained in the above description or shown in the accompanying drawing shall be interpreted as illustrative and not in a limiting sense.

We claim:

1. A governor mechanism for association with a part of a vehicle acceleration system that moves in a substantially straight line comprising a rotary mounting member, abutment stops of different effective lengths projecting therefrom and each movable upon predetermined rotary movement of said member into the path of movement of said part whereby to limit the movement thereof, means including connections to the vehicle dash or instrument board for imparting predetermined rotary movement to said member to positions corresponding to the operative stop positions of said abutment stops, and a plural position locking means operative to lock said member in any one of the positions to which it has been actuated and requiring positive release for imparting further rotary movement to said member.

2. A governor mechanism for association with a part of a vehicle acceleration system that moves in a substantially straight line comprising a rotary mounting member, abutment stops of different effective lengths projecting therefrom and each movable upon predetermined rotary movement of said member into the path of movement of said part whereby to limit the movement thereof, means including connections to the vehicle dash or instrument board for imparting predetermined rotary movement to said member to positions corresponding to the operative stop positions of said abutment stops, and a plural position locking means mounted on the dash or instrument board and operatively connected to said last means, said locking means being operative to lock said member in any one of the positions to which it has been actuated and requiring positive release for imparting further rotary movement to said member.

3. A governor mechanism for association with a part of a vehicle acceleration system that moves in a substantially straight line comprising a mounting plate secured to the flame-wall of the vehicle, a member mounted for rotation in said plate, a plurality of abutment stops of different effective lengths carried by said member and adapted to project therefrom into the path of movement of said part whereby to limit movement of the latter, means for imparting predetermined rotary movement of said member to positions corresponding to the operative stop positions of said abutment stops, including a rotary stem extending through the dash or instrument board of the vehicle and operating connections between said stem and said member, and means operative to rotate said stem and to lock said stem in the position to which it has been rotated.

4. A governor mechanism for association with a part of a vehicle acceleration system that moves in a substantially straight line comprising a mounting plate secured to the flame-wall of the vehicle, a member mounted for rotation in said plate, a plurality of abutment stops of different effective lengths carried by said member and adapted to project therefrom into the path of movement of said part whereby to limit movement of the latter, means for imparting predetermined rotary movement of said member including a rotary stem extending through the dash or instrument board of the vehicle and flexible connections between said stem and said member, and key-operated means for rotating said stem and for locking said stem in the position to which it has been rotated, said locking means requiring insertion of a key to rotate said stem from one position to another.

5. A governor mechanism for association with a part of a vehicle acceleration system that moves in a substantially straight line comprising a rotary mounting member, abutment stops of different effective lengths projecting therefrom and each movable upon predetermined rotary movement of said member to a position in the path of movement of said part whereby to limit the movement thereof, means for imparting predetermined rotary movement to said mounting member to positions corresponding to the operative stop positions of said abutment stops, operator controlled means for locking said member in any one of the positions to which it has been moved, and means for sealing said member against unauthorized movement from said position.

6. A governor mechanism for association with a part of a vehicle acceleration system that moves in a substantially straight line comprising a mounting plate secured to the flame-wall of the vehicle, a member mounted for rotation in said plate, a plurality of abutment stops of different effective lengths carried by said member and each movable into a position in the path of movement of said part whereby to limit movement of the latter, means for imparting predetermined rotary movement of said member to positions corresponding to the operative stop positions of said abutment stops including a rotary stem extending through the dash or instrument board of the vehicle and operating connections between said stem and said member, key-operated means for rotating said stem and for locking said stem in the position to which it has been rotated, said locking means requiring insertion of a key to rotate said stem from one position to another, and means for sealing said member against unauthorized movement from the position to which it is set by said key-operated means.

WILLIAM E. CRAWFORD.
JOHNNIE J. SHOULTS.